(12) United States Patent
Suzuki et al.

(10) Patent No.: US 10,148,140 B2
(45) Date of Patent: Dec. 4, 2018

(54) MOTOR

(71) Applicant: ASMO CO., LTD., Shizuoka-ken (JP)

(72) Inventors: Takumi Suzuki, Toyohashi (JP); Yuuji Yamashita, Toyohashi (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 397 days.

(21) Appl. No.: 14/162,548

(22) Filed: Jan. 23, 2014

(65) Prior Publication Data

US 2014/0210306 A1    Jul. 31, 2014

(30) Foreign Application Priority Data

Jan. 28, 2013  (JP) ................................ 2013-013341
Jan. 28, 2013  (JP) ................................ 2013-013346

(51) Int. Cl.
*H02K 1/18*      (2006.01)
*H02K 5/15*      (2006.01)

(52) U.S. Cl.
CPC .............. *H02K 1/185* (2013.01); *H02K 5/15* (2013.01)

(58) Field of Classification Search
CPC ............ H02K 1/185; H02K 5/15; H02K 1/18; H02K 1/182; H02K 1/187
USPC .... 310/216.134, 216.049, 216.016, 216.009, 310/216.055, 216.058, 216.129, 216.011, 310/217, 413, 432, 90, 89, 254.1, 310/216.004, 216.015, 216.089
See application file for complete search history.

(56) References Cited

U.S. PATENT DOCUMENTS

| | | | | |
|---|---|---|---|---|
| 1,771,475 A | * | 7/1930 | Wright | H02K 1/185 |
| | | | | 310/162 |
| 4,886,990 A | * | 12/1989 | Barker | D06F 37/304 |
| | | | | 310/172 |
| 5,640,064 A | * | 6/1997 | Boyd, Jr. | H02K 1/165 |
| | | | | 29/598 |

(Continued)

FOREIGN PATENT DOCUMENTS

| | | | | |
|---|---|---|---|---|
| CN | 101005216 A | * | 7/2007 | ........... H02K 1/1185 |
| CN | 102290879 A | | 12/2011 | |

(Continued)

OTHER PUBLICATIONS

English translation for JP 2002-272025; Takahama et al.; Japan; Sep. 2002.*

(Continued)

*Primary Examiner* — Bernard Rojas
*Assistant Examiner* — Ahmed Elnakib
(74) *Attorney, Agent, or Firm* — Christensen, Fonder, Dardi & Herbert PLLC (57) ABSTRACT

A motor includes a stator having a stator core, a first frame and a second frame, which are arranged on two axial sides of the stator core, a coupling member, which couples the first and second frames at a radially outer side of the stator while applying a holding load to the first and second frames in the axial direction, and a rotor, which is arranged at a radially inner side of the stator. The stator core includes a held portion that projects toward a radially outer side from a main circumferential portion of the stator core. The first and second frames hold, in between, at least the held portion of the stator core in the axial direction.

15 Claims, 8 Drawing Sheets

(56) References Cited

U.S. PATENT DOCUMENTS

| | | | | |
|---|---|---|---|---|
| 6,242,836 | B1* | 6/2001 | Ishida | H02K 3/345 |
| | | | | 29/596 |
| 6,337,530 | B1* | 1/2002 | Nakamura | H02K 5/15 |
| | | | | 310/216.044 |
| 6,348,753 | B1* | 2/2002 | Sakai | H02K 5/15 |
| | | | | 310/191 |
| 2001/0036414 | A1* | 11/2001 | Makino | H02K 1/185 |
| | | | | 417/312 |
| 2006/0066172 | A1* | 3/2006 | Takeuchi | H02K 21/222 |
| | | | | 310/52 |
| 2006/0181173 | A1* | 8/2006 | Takahashi | H02K 1/16 |
| | | | | 310/216.011 |
| 2006/0197402 | A1 | 9/2006 | Gomyo et al. | |
| 2008/0061653 | A1* | 3/2008 | Sagara | H02K 1/148 |
| | | | | 310/254.1 |
| 2008/0106167 | A1* | 5/2008 | Gomyo | H02K 1/146 |
| | | | | 310/216.016 |
| 2009/0200887 | A1* | 8/2009 | Okamoto | H02K 1/185 |
| | | | | 310/195 |
| 2011/0006620 | A1* | 1/2011 | Kawasaki | H02K 1/148 |
| | | | | 310/48 |
| 2012/0153768 | A1* | 6/2012 | Sanji | H02K 15/024 |
| | | | | 310/216.009 |
| 2012/0326554 | A1* | 12/2012 | Kinpara | H02K 1/16 |
| | | | | 310/216.004 |
| 2013/0002086 | A1* | 1/2013 | Kaiser | H02K 1/16 |
| | | | | 310/216.009 |

FOREIGN PATENT DOCUMENTS

| | | | |
|---|---|---|---|
| CN | 202260679 U | | 5/2012 |
| EP | 0793332 | * | 9/1997 |
| JP | H07-284257 A | | 10/1995 |
| JP | 2002-272025 A | | 9/2002 |
| JP | 2011-239533 A | | 11/2011 |
| WO | WO 2005/022718 | * | 3/2005 |
| WO | 2008/012880 A1 | | 1/2008 |

OTHER PUBLICATIONS

English translation of JP 2002-272025; Takahara et al. Japan. Sep. 2002.*
English translation of JP 2002-272025; Takahara et al. Sep. 2002.*
English translation of JP 2002272025; Sep. 2002.*
English translation of JP 2011004457; Jan. 2011.*
Japanese Office Action of JP 2013-013346 dated May 31, 2016.

* cited by examiner

MOTOR

BACKGROUND OF THE INVENTION

The present invention relates to a motor.

Japanese Laid-Open Patent Publication No. 2011-239533 describes a motor including two frames coupled to two axial sides of a stator to hold the stator in between in the axial direction. The stator includes a stator core, a plurality of teeth extending toward a radially inner side from a main circumferential portion of the stator core, and an armature winding attached to the teeth. The two frames are coupled to each other by coupling members, such as through bolts, while holding the main circumferential portion of the stator core in between in the axial direction. A rotor, which is arranged at the radially inner side of the stator, is rotatably supported by bearings coupled to the two frames. The motor of such a structure allows for the main circumferential portion of the stator core to be exposed to the outside from between the frames so that heat is easily released from the stator.

SUMMARY OF THE INVENTION

In the motor described above, the coupling members coupling the frames are located at the radially outer side of the main circumferential portion of the stator that is held between the frames. Accordingly, a holding load of the coupling members and a reaction force the frame receives from the main circumferential portion of the stator core form a force couple. When the holding load is large, the frame may be deformed.

It is an object of the present invention to provide a motor capable of limiting deformation of the frames that hold the stator core in between.

One aspect of the present invention is a motor including a stator, a first frame, a second frame, a coupling member that couples the first and second frames, and a rotor rotatably supported by the first and second frames and arranged at the radially inner side of the stator. The stator includes a stator core, a plurality of teeth extending toward a radially inner side from a main circumferential portion of the stator core, and an armature winding attached to the teeth. The stator core includes a held portion that projects toward a radially outer side from the main circumferential portion. The first frame and the second frame are respectively arranged on two axial sides of the stator core to hold, in between, at least the held portion of the stator core in the axial direction. The first frame and the second frame are formed so that the main circumferential portion of the stator core is exposed to the exterior from between the first frame and the second frame. The coupling member couples the first and second frames at the radially outer side of the stator while applying a holding load to the first and second frames in the axial direction.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a motor will now be described.

Figure 1:
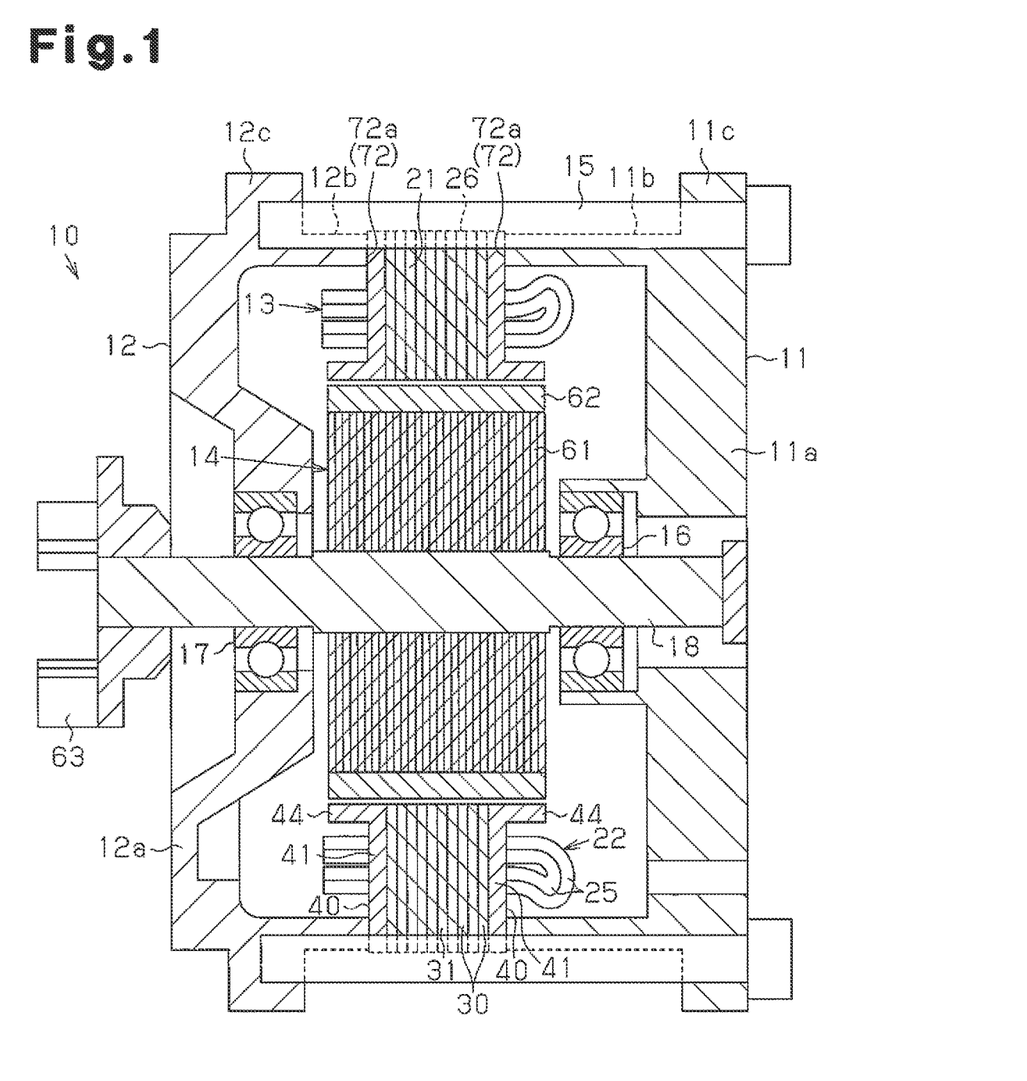
FIG. 1 is a schematic cross-sectional view showing one embodiment of a motor.

As shown in FIG. 1, a motor 10 of the present embodiment includes a rear frame 11 and a front frame 12, an annular stator 13, which is held between the rear frame 11 and the front frame 12 in the axial direction of the motor 10, and a rotor 14, which is arranged at the radially inner side of the stator 13. The front frame 12 holds an output side (closer to a joint 63, described later) in the axial direction of the motor 10. The rear frame 11 holds the side of the motor 10 opposite to the output side in the axial direction. Through bolts 15 fasten and fix the frames 11 and 12 at positions located at the radially outer side of the stator 13 so that the frames 11 and 12 are not separated from each other.

Frames

The rear frame 11 and the front frame 12 are made from a metal material such as aluminum, steel, and the like. The rear frame 11 includes a substantially disk-shaped main body portion 11*a* and a cylindrical stator holding portion 11*b*, which extends in the axial direction of the motor 10 from the peripheral edge of the main body portion 11*a*. The front frame 12 also has substantially the same structure and includes a substantially disk-shaped main body portion 12*a* and a circular ring-shaped stator holding portion 12*b*, which extends in the axial direction of the motor 10 from the circumferential edge of the main body portion 12*a*. Coaxially arranged bearings 16 and 17 are held at radially middle sections of the main body portions 11*a* and 12*a* in the frames 11 and 12. A rotation shaft 18 of the rotor 14 is axially supported by the bearings 16 and 17.

Fastening portions 11*c* and 12*c* are formed in the main body portions 11*a* and 12*a* of the frames 11 and 12 extending toward the radially outer side from a plurality of locations (e.g., two locations) in the peripheral edge. In the present embodiment, two fastening portions 11*c* are arranged at positions facing each other and separated by 180 degrees in the circumferential direction. Further, the two fastening portions 12*c* are arranged at positions facing each other and separated by 180 degrees in the circumferential direction. Thus, the number of the fastening portions 11*c* in the rear frame 11 is the same as the number of the fastening portions 12*c* in the front frame 12, and the fastening portions 11*c* and 12*c* are faced to each other in the axial direction of the rotation shaft 18. The through bolts 15 are fastened to paired ones of the fastening portions 11*c* and 12*c* so that the frames 11 and 12 are fixed to each other holding the stator 13 in between. The fastening portions 11c and 12c are each located at the axially outer side of the stator holding portions 11b and 12b.

Stator

The stator 13 includes an annular stator core 21, which is held between the stator holding portions 11b and 12b of the frames 11 and 12, and armature windings 22, which are attached to the stator core 21.

Figure 2:
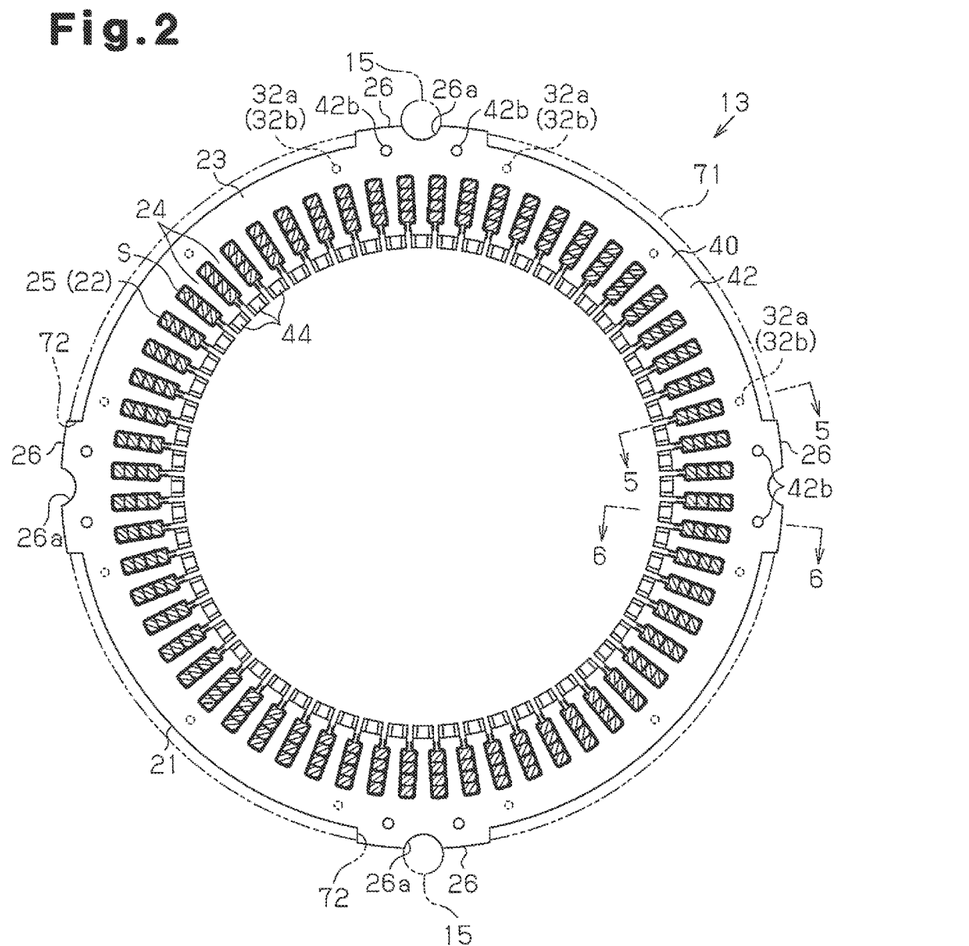
FIG. 2 is a plan view of a stator in the motor of FIG. 1.
Figure 7:
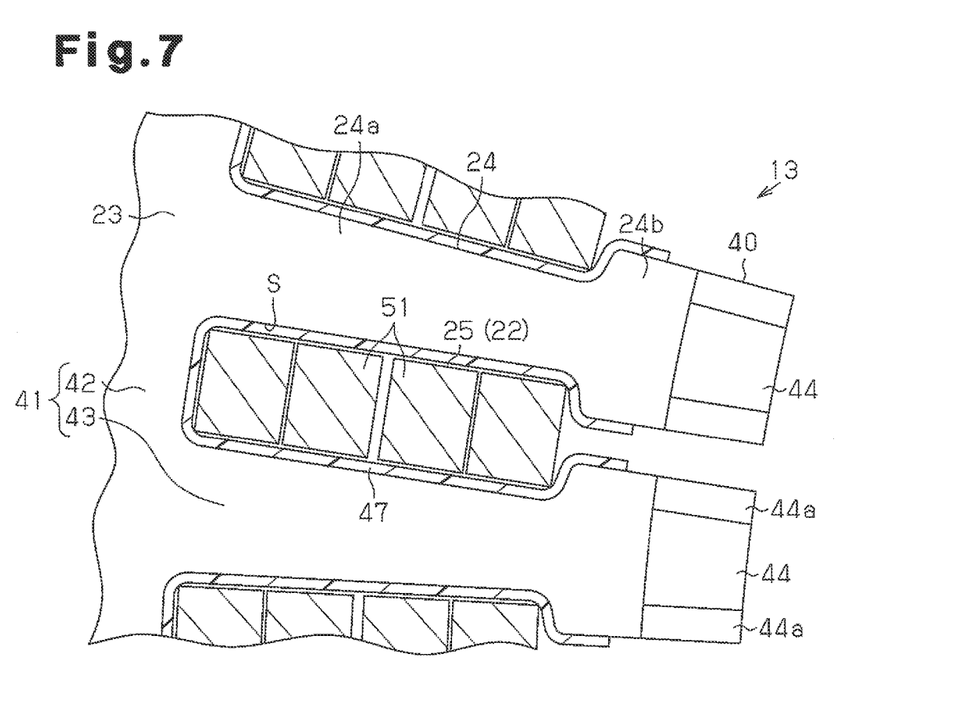
FIG. 7 is an enlarged plan view showing the motor of FIG. 1 in part.

As shown in FIGS. 2 and 7, the stator core 21 includes a cylindrical portion 23 (main circumferential portion), which forms a circumferential region, a plurality of (sixty in the present embodiment) teeth 24 extending toward the radially inner side from the cylindrical portion 23, and an outer circumferential core projection 26 (held portion) projecting toward the radially outer side from the outer circumferential surface of the cylindrical portion 23.

Four outer circumferential core projections 26 are formed at equal intervals (intervals of 90 degrees) in the circumferential direction of the cylindrical portion 23. Each outer circumferential core projection 26 is formed to extend in the axial direction of the cylindrical portion 23 from one axial end to the other axial end. An engagement groove 26a (engagement recess), which is curved inward and extends in the axial direction, is formed in the end face at a circumferentially central part of the outer circumferential core projection 26.

Two of the outer circumferential core projections 26 that are located at opposite sides and separated from each other by 180 degrees are located at the same positions in the circumferential direction as the two through bolts 15. Each through bolt 15 is fitted into the engagement groove 26a formed in one of the outer circumferential core projections 26. The engagement groove 26a is engaged with the through bolt 15 in the circumferential direction. This engagement restricts free rotation of the stator core 21.

Each tooth 24 includes a tapered radial extending portion 24a, in which the circumferential width decreases toward the radially inner side, and a wide portion 24b, which is formed at a distal end (radially inner end) of the radial extending portion 24a and has a greater circumferential width than the radial extending portion 24a. Two circumferential end faces of the radial extending portion 24a are flat and extend parallel to the axis of the rotation shaft 18. Further, an end face of one radial extending portion 24a is parallel to the end face of an adjacent one of the radial extending portions 24a in the circumferential direction.

A void between adjacent ones of the teeth 24 forms a slot S, which accommodates segment conductors 25 of the armature windings 22. That is, the slot S is formed by circumferential side surfaces of adjacent teeth 24 and the inner circumferential surface of the cylindrical portion 23 between the teeth 24. In the present embodiment, the teeth 24 are formed so that the circumferential end faces are parallel in adjacent ones of the radial extending portions 24a in the circumferential direction and so that each slot S is formed to be substantially rectangular as viewed shape when seen in the axial direction. Each slot S extends through the stator core 21 in the axial direction and opens toward the radially inner side. The number of slots S formed in the stator core 21 is the same as the number (sixty in the present embodiment) of teeth 24.

Stator Core

The stator core 21 having the shape described above is formed by stacking and integrating a plurality of steel plates.

Figure 4:
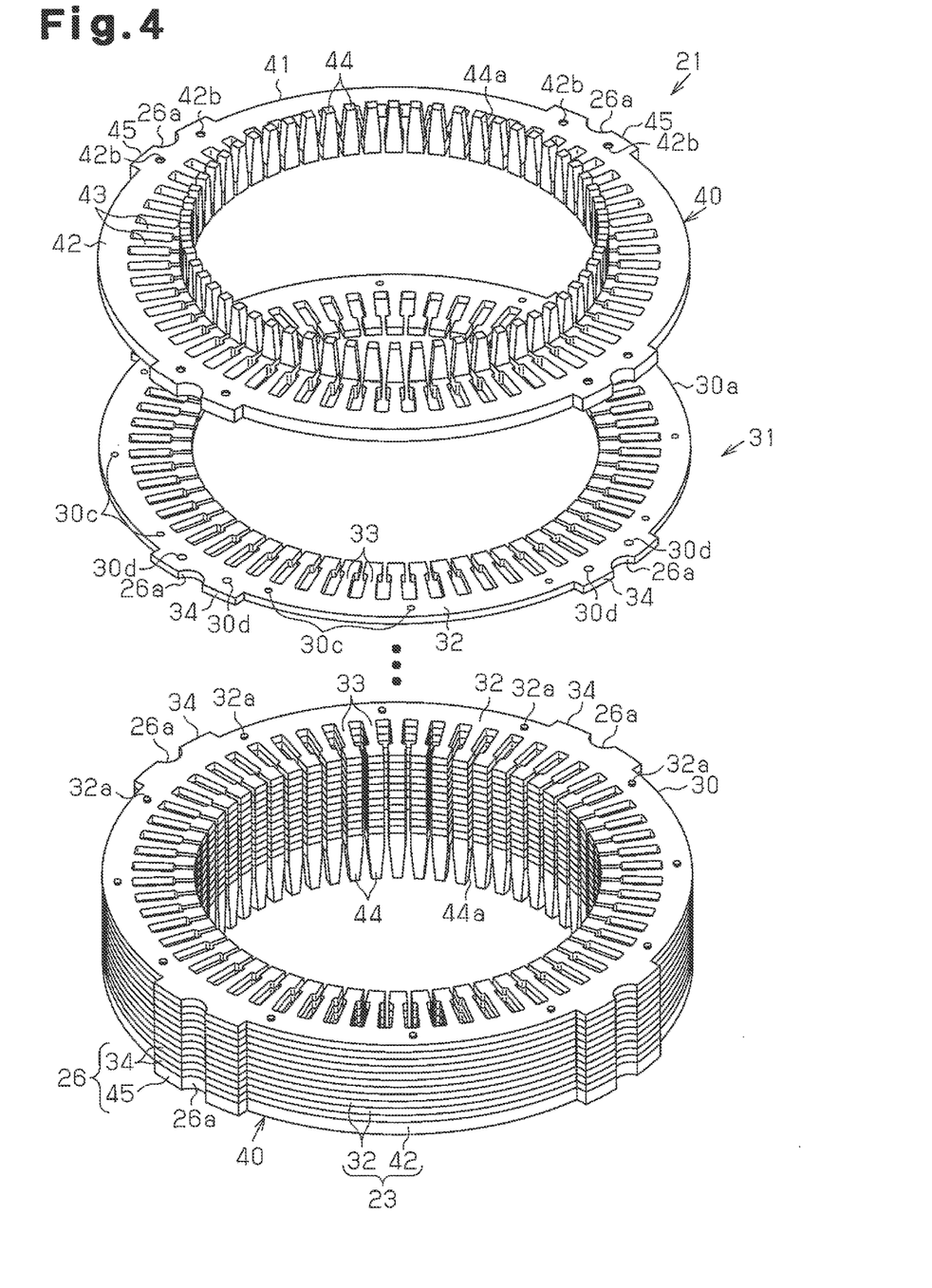
FIG. 4 is an exploded perspective view of a stator core in the motor of FIG. 1.

In detail, as shown in FIG. 4, the stator core 21 includes a main core 31 and magnetic plates 40 (auxiliary cores) fixed to two axial ends of the main core 31. The main core 31 is formed by stacking, swaging, and integrating a plurality of core sheets 30, which are pressed and punched out from steel plates, in the axial direction. In the present embodiment, the magnetic plates 40 having identical shapes are each set on one of the two axial sides of the main core 31.

The core sheets 30 of the main core 31 have identical shapes and are each set so that the plate surface is orthogonal to the axial direction. Each core sheet 30 includes an annular portion 32, a plurality of tooth formation portions 33 extending toward the radially inner side from the annular portion 32, and a plurality of projections 34 projecting toward the radially outer side from the annular portion 32. The core sheets 30 are stacked so that the tooth formation portions 33 are overlapped in the axial direction and the projections 34 are overlapped in the axial direction.

The magnetic plates 40 are formed by undergoing pressing. As shown in FIGS. 2, 4, and 7, each magnetic plate 40 includes a plate-like stacked portion 41 stacked on the core sheet 30 located at one of the two axial ends of the main core 31. The stacked portion 41 is stacked so as to be parallel and coaxial to the core sheets 30 of the main core 31. The magnetic plate 40 has a plate thickness T1 set to be greater than a plate thickness T2 of each core sheet 30 of the main core 31 (see FIG. 9).

The stacked portion 41 includes an annular portion 42 axially overlapped with the annular portions 32 of the core sheets 30, a plurality of tooth formation portions 43 extending toward the radially inner side from the annular portion 42, and a plurality of projections 45 projecting toward the radially outer side from the annular portion 42. The annular portion 42, the tooth formation portion 43, and the projection 45 of the stacked portion 41 are respectively shaped identically to the annular portion 32, the tooth formation portion 33, and the projection 34 of each core sheet 30 as viewed in the axial direction. The magnetic plate 40 is set so that the annular portion 42, the tooth formation portion 43, and the projection 45 of the stacked portion 41 are axially overlapped with the annular portion 32, the tooth formation portion 33, and the projection 34 of each core sheet 30.

The annular portions 32 and 42 of the core sheets 30 and the magnetic plates 40 form the cylindrical portion 23 of the stator core 21. The tooth formation portions 33 and 43 form the teeth 24 of the stator core 21. The projections 34 and 45 form the outer circumferential core projections 26. The annular portions 32 and 42, the tooth formation portions 33 and 43, and the projections 34 and 45 as viewed in the axial direction are shaped identically to the cylindrical portion 23, the teeth 24, and the outer circumferential core projections 26 and will thus not be described in detail.

The radially inner side end (end closer to the rotor 14) of each tooth formation portion 43 in each magnetic plate 40 forms a rotor opposing portion 44 extending toward the axially outer side (side opposite to the main core). The rotor opposing portion 44 is formed by bending the radially inner side end of the tooth formation portion 43 at a right angle toward the axially outer side. That is, the magnetic plate 40 is formed so that the plate surface of the rotor opposing portion 44 bent toward the axially outer side faces the radial direction. The inner diameter surface of the rotor opposing portion 44 is curved to have the same diameter as the inner diameter of the main core 31 (core sheet 30). The axial thickness of the stacked portion 41 and the radial thickness of the rotor opposing portion 44 are equal to each other and determined by the plate thickness T1 of the magnetic plate 40. The thickness of a bent portion (corner formed by the tooth formation portion 43 and the rotor opposing portion 44) between the rotor opposing portion 44 and the tooth formation portion 43 is formed to be thicker than the plate thickness of the rotor opposing portion 44 (i.e., plate thickness T1 of the magnetic plate 40).

Figure 3:
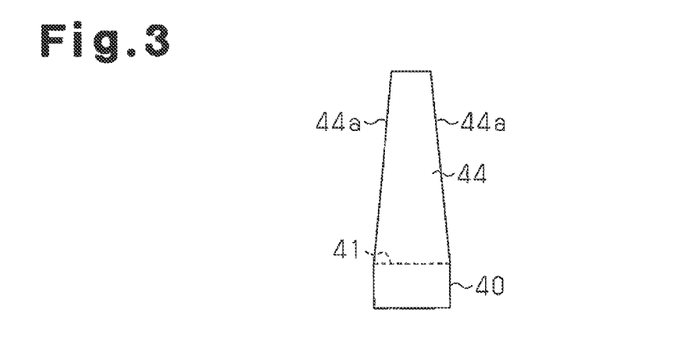
FIG. 3 is a front view illustrating a rotor opposing portion of a magnetic plate in the motor of FIG. 1.

As shown in FIG. 3, each of the two circumferential sides of each rotor opposing portion 44 defines a side edge 44a serving as a circumferential side. The side edge 44a is inclined in the circumferential direction to the axial direction of the rotation shaft 18. The side edge 44a is inclined toward the middle of the rotor opposing portion 44 in the circumferential direction at locations closer to the distal end (separated from the main core). Further, the side edges 44a are formed to be symmetric relative to a center line in the circumferential direction of the rotor opposing portion 44 when the rotor opposing portion 44 is viewed from the radial direction. Thus, the rotor opposing portion 44 is formed so that the circumferential width of the axial basal end (axially inner side) is equal to the circumferential width of the distal end (wide portion 24b) of the tooth formation portion 43 and the circumferential width decreases toward the axial distal end (axially outer side). This obtains a trapezoidal shape as viewed in the radial direction. The rotor opposing portions 44 are all identically shaped in the present embodiment.

The annular portions 32 of the core sheets 30 are fixed together by swaging dowels into holes of the annular portions 32 that are adjacent in the axial direction. The annular portion 42 in the stacked portion 41 of each magnetic plate 40 is fixed by swaging a dowel into a hole formed in the annular portion 32 of the core sheet 30 located at one of the two axial ends.

Figure 5:
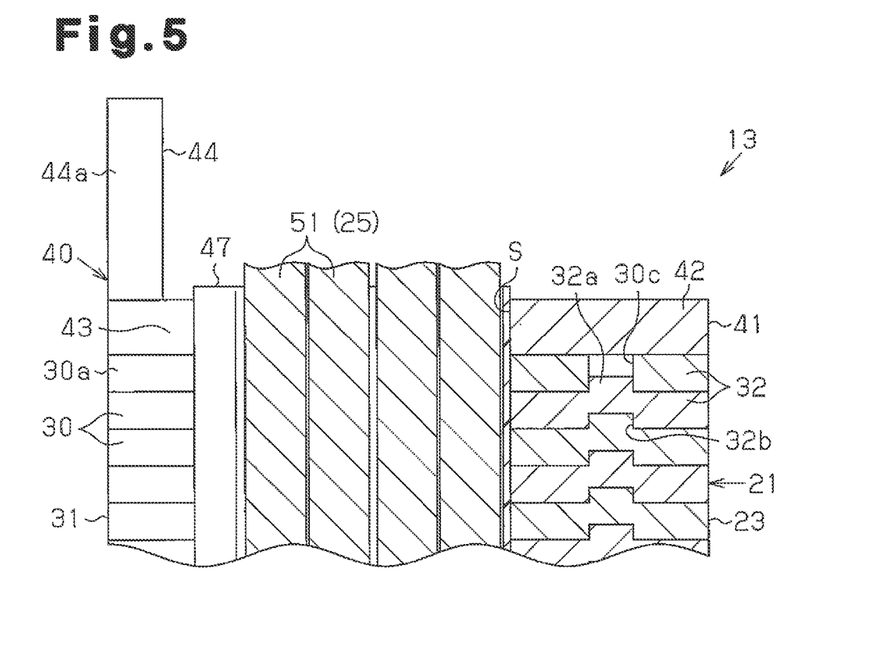
FIG. 5 is a cross-sectional view taken along line 5-5 in FIG. 2.

As shown in FIGS. 2, 4, and 5, each core sheet 30, excluding the core sheet 30a located at one axial end, includes protrusions 32a (dowels) that protrude in the plate thickness direction and are formed in by performing a pressing process on the annular portion 32. Twelve protrusions 32a are formed at equal intervals (30-degree intervals) in the circumferential direction of the annular portion 32. When the protrusions 32a are formed, a recess 32b is formed in the rear side of each protrusion 32a. In the present embodiment, the protrusions 32a and the recesses 32b are formed at locations separated in the circumferential direction from the projections 34 and located at the radially outer sides of predetermined slots S (in detail, every five slots S in the circumferential direction). The protrusions 32a are pressed and fitted (dowel-swaged) into the recesses 32b of the adjacent core sheet 30 in the axial direction. The core sheet 30a at one axial end includes a plurality of through holes 30c, into which the protrusions 32a of the adjacent core sheet 30 are press-fitted and fixed. Thus, the protrusions 32a and the recesses 32b form swaged portions for the core sheets 30, and the core sheets 30 are integrally fixed by the swaged portions to form the main core 31.

Figure 6:
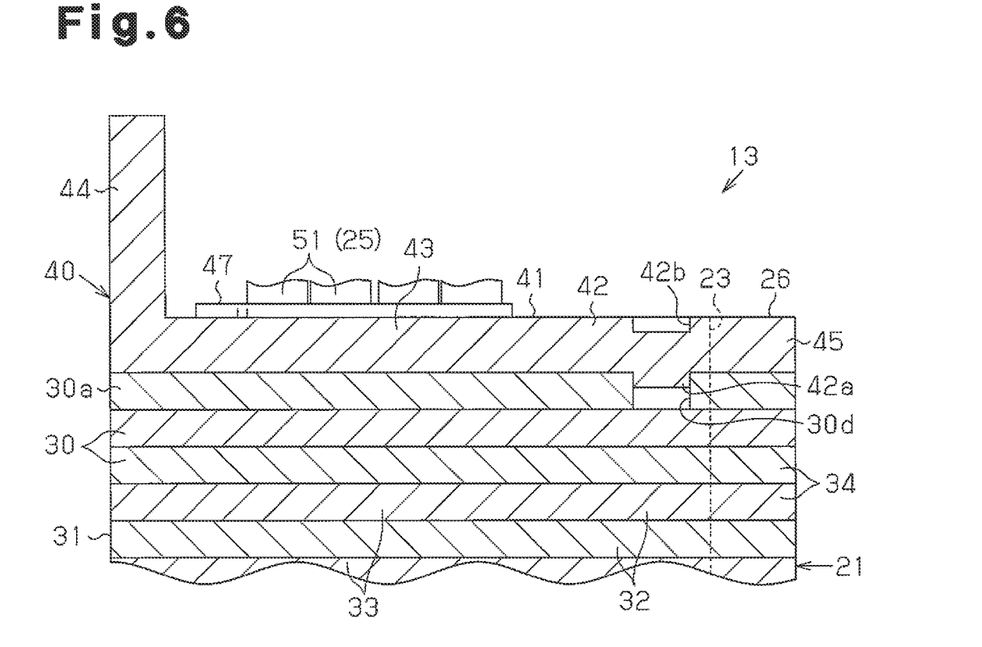
FIG. 6 is a cross-sectional view taken along line 6-6 in FIG. 2.

As shown in FIGS. 2, 4, and 6, the annular portion 42 (stacked portion 41) of each magnetic plate 40 is pressed to form the protrusions 42a (dowels) that project toward the main core 31 (toward the core sheet 30) in the plate thickness direction. When forming the protrusions 42a, the recesses 42b are formed in the opposite side of the protrusions 42a. The protrusions 42a are formed in the annular portion 42 at the radially inner side of the projections 45 and at the same circumferential positions as the projections 45. In the present embodiment, a total of eight protrusions 42a, two for each projection 45, are formed. At the radially inner side of each projection 45, a protrusion 42a is formed at a position separated from each of the two circumferential sides of the engagement groove 26a. That is, the protrusions 42a are formed at locations where the formation of the projections 45 increases the radial width. The protrusions 42a limit increases in the magnetic resistance. The distance from the axis of the stator core 21 to the center of each protrusion 42a is set to be greater than the distance from the axis of the stator core 21 to the center of each protrusion 32a.

The core sheet 30 (core sheet 30a) that is adjacent to the stacked portion 41 of the magnetic plate 40 in the axial direction includes through holes 30d extending in the plate thickness direction that are formed at locations corresponding to the protrusions 42a. The protrusions 42a of the magnetic plate 40 are pressed and fitted (dowel-swaged) into each through hole 30d of the core sheet 30a. Thus, the annular portion 42 of the magnetic plate 40 is fixed to the annular portion 32 of the core sheet 30a, and the magnetic plates 40 are formed integrally with the two axial sides of the main core 31.

In the present embodiment, the through holes 30d to which the protrusions 42a of the magnetic plates 40 are swaged is formed only in the core sheets 30 that are adjacent to the magnetic plates 40. Instead, the through hole 30d may be formed in a number of (e.g., two to three) the core sheets 30 from the core sheet 30 that is adjacent to each magnetic plate 40. Alternatively, the through holes 30d may be formed in all of the core sheets 30.

The protrusions 32a and 42a formed when a pressing process is performed each have an outer diameter (dowel diameter) set to be suitable for the thickness of the steel plate that is processed so that an appropriate protrusion amount may be ensured for the protrusions 32a and 42a. More specifically, in the present embodiment, the plate thickness T1 of the magnetic plate 40 is greater than the plate thickness T2 of the core sheet 30. Thus, the dowel diameter of each protrusion 42a between the magnetic plate 40 and the core sheet 30a is set to be greater than the dowel diameter of the protrusion 32a between the core sheets 30. This provides an appropriate protrusion amount for the protrusions 32a and 42a. As a result, the desirable swaging strength is obtained. Further, a larger dowel diameter increases the influence of the protrusions 32a and 42a on a magnetic flow (i.e., large magnetic resistance). Thus, it is desirable that the minimum dowel diameter be set to obtain the swaging strength.

When stacking the core sheets 30, which are punched out from steel plates with the same punching die (not shown), to form the main core 31 of the present embodiment, the core sheets 30 are rotated and shifted from one another in the circumferential direction by a predetermined angle (90 degrees). This offsets and limits deterioration in the cogging torque characteristics caused by the accuracy of each core sheet 30 in the stator core 21 (particularly, the accuracy of the circumferential width for each tooth formation portion 33). That is, if the core sheets 30 are stacked without being shifted from one another, the cogging torque characteristics may be deteriorated by, in particular, variations in the shape of the tooth formation portions 33 of the core sheets 30. In this respect, by shifting the cogging torque characteristics of the core sheets 30 in the circumferential direction, most of the amplitude of the cogging torque may be canceled so that satisfactory cogging torque characteristics may be obtained as a whole.

The outer circumferential core projections 26 of the stator core 21 are formed at locations set in accordance with the number of teeth 24 (angle between the teeth 24) so that each core sheet 30 may be rotated and stacked. That is, in the present embodiment, since there are sixty teeth 24, the outer circumferential core projections 26 are formed at intervals of ninety degrees, which is the multiple of the six-degree circumferential interval of the teeth 24.

In the present embodiment, the projections 34 of the core sheets 30 (projections 45 of the magnetic plates 40) are formed at ninety-degree intervals in the circumferential direction. Thus, by setting the projections 34 (projections 45) at the corners of the four sides of a square steel plate when punching steel plates to form the core sheets 30 (magnetic plates 40), smaller steel plates may be used. This improves the yield.

As shown in FIGS. 5 and 7, each slot S of the stator core 21 receives a sheet of an insulating member 47, which is formed from an insulative resin material. Each insulating member 47 is formed along the wall surface of the slot S and bent at the radially outer end of the slot S. Each insulating member 47 is axially inserted into the slot S and has an axial length that is set to be slightly greater than the axial length of the slot S. Thus, the two axial ends of the insulating member 47 project out of the two axial ends of the slot S.

Armature Windings

Figure 9:
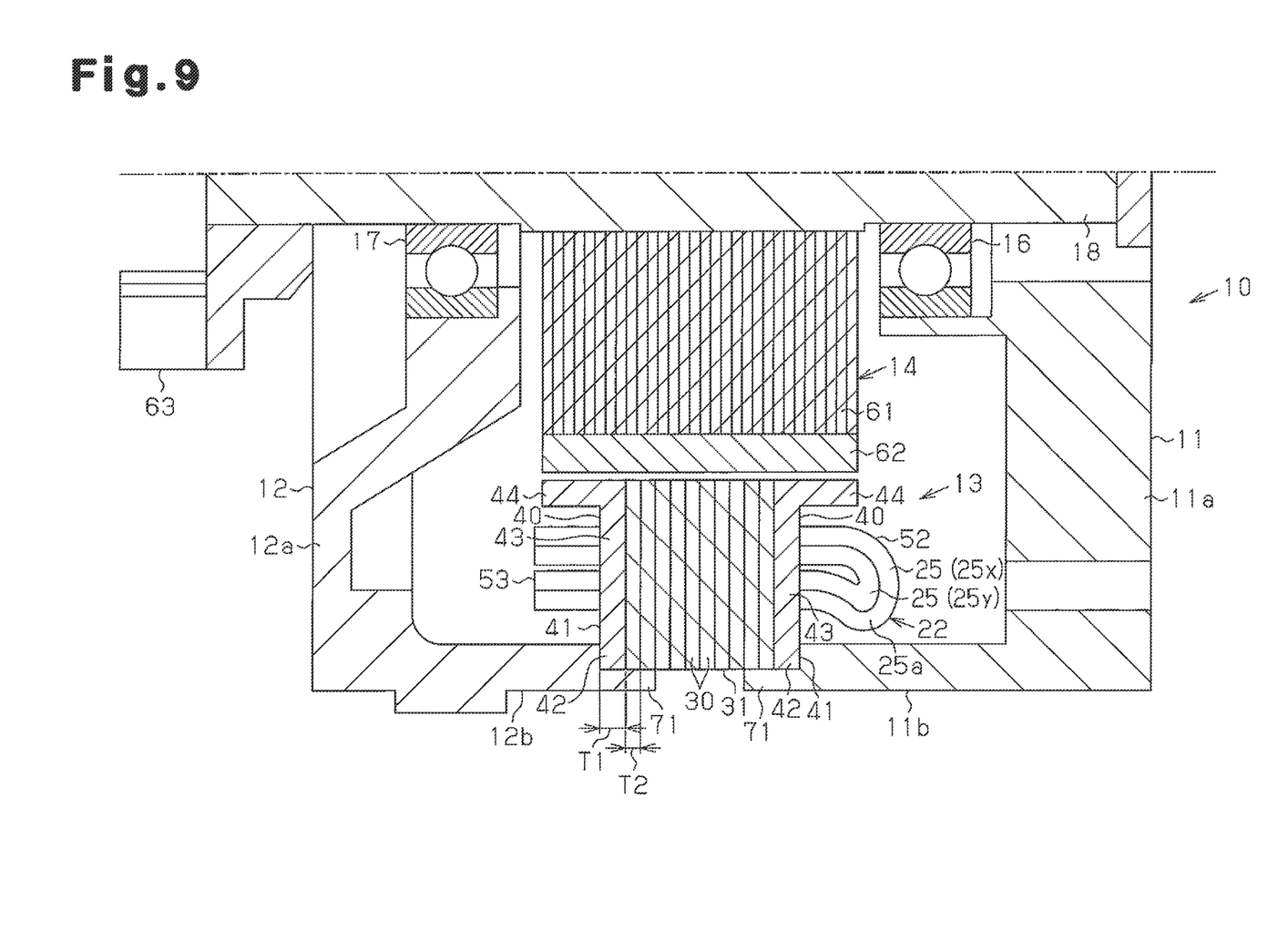
FIG. 9 is a schematic cross-sectional view of a portion of the motor shown in FIG. 1.

As shown in FIGS. 7 and 9, the armature windings 22 attached to the stator core 21 described above includes a plurality of segment conductors 25. The armature windings 22 for three phases (U-phase, V-phase, and W-phase) are in a Y connection that connect predetermined ones of the segment conductors 25. The segment conductors 25 are formed from wires having the same cross-sectional shape (tetragonal cross-section).

Each segment conductor 25 includes two straight portions 51 (see FIG. 5) that are inserted into the slots S, a first projection 52 that projects out of a slot S in one axial direction (closer to rear frame 11) and a second projection 53 that projects out of a slot S in the other axial direction (closer to the front frame 12). The segment conductor 25 is bent at a portion of the first projection 52 and substantially U-shaped. The first and second projections 52 and 53 radially face the rotor opposing portion 44 at the two axial sides through a gap.

The two straight portions 51 are formed so that their radial positions are shifted from each other and are each inserted into the slot S at different circumferential positions. The straight portions 51 are arranged at the inner side of the insulating member 47 in each slot S (refer to FIG. 7). The insulating member 47 electrically insulates the segment conductors 25 from the stator core 21.

The segment conductors 25 are arranged so that four straight portions 51 are aligned in the radial direction in each slot S. FIG. 9 shows two types of segment conductors 25x and 25y used as the segment conductors 25. In the outer segment conductor 25x shown in FIG. 9, the two straight portions 51 are arranged as the first one and the fourth one from the radially inner side. In the segment conductor 25y shown in FIG. 9, the two straight portions 51 are arranged as the second one and the third one from the radially inner side. The armature windings 22 are mainly formed from the two types of the segment conductors 25x and 25y. However, for example, a different type of segment conductor (e.g., segment conductor including only one straight portion) may be used as the segment conductor forming an end of an armature winding 22 (power supply connecting terminal, neutral point connecting terminal, etc.).

Each straight portion 51 of the segment conductor 25 extends through a slot S in the axial direction. The second projection 53 of the segment conductor 25 projecting close to the front frame 12 is bent in the circumferential direction and electrically connected to the second projection 53 of another segment conductor 25 or a special type of segment conductor through welding. Thus, the segment conductors 25 form the armature windings 22.

Figure 8:
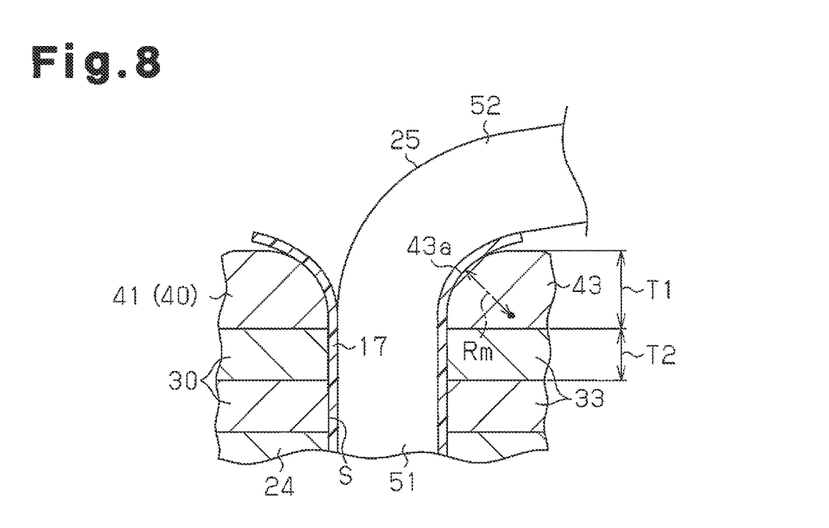
FIG. 8 is a schematic cross-sectional view showing a bent portion of a segment conductor of FIG. 7.

The first and second projections 52 and 53 of the segment conductor 25 are bent in the circumferential direction from the straight portion 51 at the two axial ends of the slot S. FIG. 8 is an enlarged view showing the periphery of the axial end of the slot S. The first projection 52 shown in FIG. 8 is bent in the circumferential direction. As shown in FIG. 8, a chamfered portion 43a, which is chamfered to have an arcuate shape, is formed at the corner of each tooth formation portion 43 in the magnetic plate 40 (stacked portion 41) forming one axial end of the slot S. In the same manner, in the magnetic plate 40 closer to the second projection 53, a chamfered portion 43a is formed at the corner of each tooth formation portion 43 forming the other axial end of the slot S. The chamfered portion 43a has an arcuate cross-section and curved in the circumferential direction along the bent shape of the first and second projections 52 and 53 to widen the area of contact with the bent portion. This limits local application of force from the corners of the tooth formation portions 43 to the bent portions in the circumferential direction of the first and second projections 52 and 53. This reduces damages to the bent portions. In the same manner, damages are reduced in the insulating member 47 held between the bent portions of the first and second projections 52 and 53 and the chamfered portions 43a. In the present embodiment, the plate thickness T1 of the magnetic plate 40 (plate thickness of the tooth formation portion 43) is greater than the plate thickness T2 of the core sheet 30. This allows the curvature radius Rm of the chamfered portion 43a to be set to be greater than the plate thickness T2 of the core sheet 30. Thus, damages to the bent portion of the segment conductor 25 may be reduced in a further preferable manner by the chamfered portion 43a that have a large curvature radius Rm. The chamfered portion 43a may have a straight cross-section.

As shown in FIG. 9, the first projection 52 including the bent portion 25a of the segment conductor 25 is formed to tilt (bulge) toward the radially outer side. The bent portion 25a is thus located toward the radially outer side of the radially middle section of the slot S, and the radially inner side end of the first projection 52 is located at the radially outer side of the radially inner side end of the slot S. This widens the gap in the radial direction of the first projection 52 and the rotor opposing portion 44 of the magnetic plate 40. Thus, interference is limited between the first projection 52 and the rotor opposing portion 44 in a further preferable manner. This not only obtains the insulation of the segment conductor 25 and the rotor opposing portion 44 is a further preferable manner but also limits increases in the cogging torque and the decreases in the output that would occur when the rotor opposing portion 44 is deformed by interference with the first projection 52.

The second projection 53 of the segment conductor 25 does not include a bent portion, and second projections 53 are welded and joined with each other. This easily obtains the gap between the second projections 53 and the rotor opposing portions 44. The welding portions of the second projections 53 are formed at the axially outer side from the axial distal end (side opposite to the main core) of the rotor opposing portions 44 closer to the front frame 12. Thus, the rotor opposing portion 44 is less likely to become hinder welding of the second projection 53. This improves the workability and further ensures insulation of the second projections 53 and the rotor opposing portions 44. The welding portions of the second projections 53 may be set at the axially inner side of the axial distal end (closer to the main core 31) of the rotor opposing portion 44 closer to the front frame 12. In this case, the second projections 53 do not project to the axially outer side from the rotor opposing portions 44. This contributes to miniaturization of the stator 13 in the axial direction.

Holding Structure of Stator Core

As shown in FIG. 1, the stator holding portions 11b and 12b of the frames 11 and 12 holding the stator 13 having the above structure are cylindrical and extend in the axial direction from the main body portions 11a and 12a of the frames 11 and 12.

As shown in FIGS. 2 and 9, the stator holding portions 11b and 12b each include a fitted portion 71 fitted to an axial end of the stator core 21. FIG. 9 shows the motor cross-section taken in the radial direction at a location where an outer circumferential core projection 26 of the stator core 21 is not formed. The fitted portion 71 is cylindrical and has an inner diameter that substantially conforms to the outer diameter of the cylindrical portion 23 of the stator core 21. Four accommodation recesses 72 are formed in the fitted portion 71 to receive the outer circumferential core projections 26 of the stator core 21. The inner circumferential surface of the fitted portion 71 contacts, in the radial direction, the outer circumferential surface of the cylindrical portion 23 (portion where the outer circumferential core projections 26 are not formed). This aligns the frames 11 and 12 and the stator core 21, and the stator core 21 is held in the radial direction by the fitted portion 71.

As shown in FIG. 1, the outer circumferential core projections 26 of the stator core 21 are fitted into the accommodation recesses 72 formed in the fitted portions 71, respectively. A bottom surface 72a of each accommodation recess 72 in the axial direction contacts the axial end of the corresponding outer circumferential core projection 26 in the axial direction (specifically, projection 45 of the magnetic plate 40). That is, the accommodation recesses 72 of the stator holding portions 11b and 12b are formed to hold the outer circumferential core projections 26 in between from two axial sides. Under this condition, the through bolts 15 couple and fasten the frames 11 and 12 to each other. This holds the outer circumferential core projections 26 of the stator core 21 between the accommodation recesses 72 of the stator holding portions 11b and 12b. Each accommodation recess 72 is in circumferential engagement with the corresponding outer circumferential core projection 26. This positions the frames 11 and 12 and the stator core 21 in the circumferential direction. The outer circumferential surface of the cylindrical portion 23 of the stator core 21 is exposed to the exterior through the gap between the stator holding portions 11b and 12b in the axial direction.

The four accommodation recesses 72 are arranged at positions corresponding to the outer circumferential core projections 26, that is, at an interval of 90 degrees in the circumferential direction. Two of the accommodation recesses 72 located at opposing positions and separated by 180 degrees from each other are formed at positions axially overlapping the fastening portions 11c and 12c of the frames 11 and 12. The fastening portions 11c and 12c receive the holding load in the axial direction from the through bolts 15, and the accommodation recesses 72 are formed at positions axially extending from the fastening portions 11c and 12c. Accordingly, the bottom surfaces 72a of the accommodation recesses 72 contacts the outer circumferential core projections 26 along lines on which the holding load of the through bolts 15 act. That is, the reaction force applied to the bottom surfaces 72a of the accommodation recesses 72 from the outer circumferential core projections 26 and the holding load received by the fastening portions 11c and 12c from the through bolts 15 do not form a force couple. This further limits deformation, particularly, in the stator holding portions 11b and 12b and the fastening portions 11c and 12c of the frames 11. As shown in FIG. 9, the stator holding portions 11b and 12b of the frames 11 and 12 contacts the entire circumference of the section closer to the radially outer side of the annular portions 42 (cylindrical portion 23). In other words, the stator holding portions 11b and 12b are formed to hold in between not only the outer circumferential core projections 26 but also the entire circumference of the section closer to the radially outer side of the annular portions 42 from both axial sides. Thus, the holding load received by the frames 11 and 12 from the through bolts 15 may be dispersed in the circumferential direction. This further suppresses deformation of the frames 11 and 12.

The distance from the axis of the stator core 21 to the center of each protrusion 32a (recess 32b) is set to be smaller than the distance from the axis of the stator core 21 to each outer circumferential core projection 26. That is, the protrusions 32a (recess 32b) are formed at the radially inner side of the outer circumferential core projections 26, which are held between the frames 11 and 12. When the protrusions 32a and the recesses 32b are swaged and fixed to the radially inner side of the annular portions 42 held between the frames 11 and 12, that is, locations separated from the region held between the frames 11 and 12, this limits increases in the magnetic resistance that occur when the protrusions 32a and the recesses 32b receive the holding load.

Rotor

As shown in FIG. 1, the rotor 14 includes the rotation shaft 18 axially supported by the bearings 16 and 17, a cylindrical rotor core 61 fixed to and rotated integrally with the rotation shaft 18, and a plurality of (ten in the present embodiment) field magnets 62 fixed to the outer circumferential surface of the rotor core 61. The field magnets 62 are formed by ferrite magnets, and the magnetic poles (N pole and S pole) are arranged to alternately differ in the circumferential direction. The axial length of the rotor core 61 and the field magnet 62 of the rotor 14 is set to be substantially equal to the axial length of the inner circumferential end of the stator core 21 (i.e., length from the distal end of the rotor opposing portion 44 of one magnetic plate 40 to the distal end of the rotor opposing portion 44 of the other magnetic plate 40). In other words, the field magnets 62 radially faces the inner circumferential surface of the main core 31 of the stator core 21 and the rotor opposing portions 44 of each magnetic plate 40.

The distal end of the rotation shaft 18 (left end in FIG. 1) extends through the front frame 12 and projects out of the motor 10. A joint 63 that rotates integrally with the rotation shaft 18 is arranged at the distal end of the rotation shaft 18. The joint 63 is coupled to an external device (not shown), and transmits the rotation of the rotation shaft 18 to the external device.

The operation of the present embodiment will now be described.

The magnetic field generated when current is supplied to the armature windings 22 of the stator 13 cooperates with the magnetic field of the field magnet 62 of the rotor 14 through the inner circumferential surface of the main core 31 and the rotor opposing portions 44 of each magnetic plate 40 to rotate the rotor 14. In the present embodiment, the plate thickness T1 of each magnetic plate 40 is set to be greater than the plate thickness T2 of each core sheet 30. Thus, magnetic saturation does not easily occur in the magnetic plates 40, and magnetism force may easily be drawn through the magnetic plates 40.

The rotor opposing portions 44 of each magnetic plate 40 are each formed to axially extend from the end closer to the rotor 14 (radially inner end) of each tooth 24 of the stator core 21. This obtains the axial length of the surface of the stator core 21 facing the rotor 14 (inner circumferential surface of the stator core 21) and achieves high output. The first and second projections 52 and 53 of the segment conductor 25 projecting from both axial sides of the slots S are arranged in voids located at the radially outer side of the rotor opposing portions 44. The first and second projections 52 and 53 face the rotor opposing portions 44 in the radial direction at the two axial sides. Accordingly, the axial length of the stator 13 (in the present embodiment, length from the axial end of the first projection 52 to the second projection 53) may be reduced while ensuring the output with the rotor opposing portions 44 of the magnetic plate 40.

Figure 11:
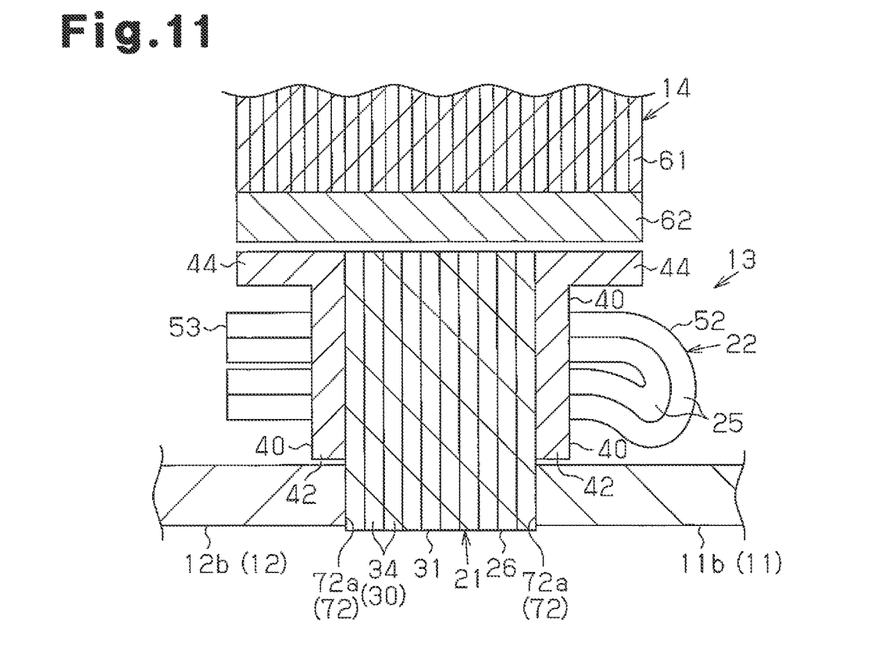
FIG. 11 is an enlarged schematic cross-sectional view showing, in part, the motor of FIG. 10.

Since the stacking thickness of the main core 31 of the stator core 21 is reduced while ensuring the output with the rotor opposing portions 44, the variations (tolerance) in the stacking thickness of the main core 31 may be reduced. This reduces variations in the axial distance between the frames 11 and 12 that hold the main core 31 in between. Further, variations are reduced in the axial distance of the entire motor 10. The magnetic plate 40 has a larger variation (tolerance) as the plate thickness T1 increases. Variations in the axial size of the entire motor 10 can be further reduced by, for example, forming the frames 11 and 12 to hold only the main core 31 and not contact the magnetic plates 40 in the axial direction, as shown in FIG. 11 that will be described later.

In the present embodiment, the outer circumferential surface of the cylindrical portion 23 of the stator core 21 is exposed to the exterior from the gap between the frames 11 and 12 (stator holding portions 11b and 12b) in the axial direction. This obtains superior properties for releasing heat from the stator core 21 toward the radially outer side. The segment conductors 25 of the armature windings 22 in the present embodiment include the straight portions 51 aligned and arranged along the radial direction in each slot S. Thus, the occupying rate of the armature windings 22 may be increased while allowing for heat to be easily released in the radial direction. Thus, by using the segment conductors 25 in the structure of the present embodiment having superior properties for releasing heat from the stator core 21 toward the radially outer side, the stator 13 has preferable heat releasing properties. Further, in the present embodiment, the outer circumferential core projections 26 are formed on the outer circumferential surface of the cylindrical portion 23 exposed to the exterior from the gap between the stator holding portions 11b and 12b in the axial direction. This increases the heat releasing area (exposed area of the outer circumference) of the stator core 21 and further improves the heat releasing property.

In the structure that uses the segment conductors 25 in the armature windings 22, a large number of slots S (number of teeth 24) accommodate the segment conductors 25, and the circumferential width of the tooth 24 tends to decrease. Therefore, in each tooth 24, to widen the area of the surface (radially inner side end face) opposing the rotor 14 and enhance the output, the structure that axially extends the radially inner side end face of the tooth 24 with the rotor opposing portion 44 as in the present embodiment is suitable. The tooth 24 of the present embodiment has a structure in which magnetic force easily concentrates at the boundary of the radial extending portion 24a, in which the circumferential width decreases toward the radially inner side, and the wide portion 24b. In this respect, the stacked portion 41 of the magnetic plate 40 is overlapped with the boundary. This reduces the magnetic concentration.

The present embodiment has the following advantages.

(1) The motor 10 includes the rear frame 11 and the front frame 12 that hold, in between, the stator 13 in the axial direction. The stator core 21 includes the outer circumferential core projections 26 (held portion) that project toward the radially outer side from the cylindrical portion 23 (main circumferential portion) forming the circumferential region. Further, the rear frame 11 and the front frame 12 are formed to hold, in between, the outer circumferential core projections 26 of the stator core 21 in the axial direction. This structure allows the outer circumferential core projections 26 that receive the holding load of the through bolts 15 (coupling member) in the stator core 21 to be located closer to the through bolts 15 in the radial direction. This limits the formation of a force couple at the frames 11 and 12 and, consequently, limits the deformation of the frames 11 and 12.

The cylindrical portion 23 of the stator core 21 is exposed to the exterior from between the frames 11 and 12. Thus, heat is released from the stator 13 in a satisfactory manner. The outer circumferential core projections 26 that project toward the radially outer side are formed in the exposed section of the cylindrical portion 23. This increases the heat releasing area (exposed area of the outer circumference) of the stator core 21 and improves the heat releasing properties.

(2) The armature windings 22 are formed by a plurality of segment conductors 25. The segment conductors 25 include first and second projections 52 and 53 that are inserted into the slots S, which extend in the stator core 21 in the axial direction, and project out of the slots S in the axial direction. The stator 13 in which the armature windings 22 are formed by the segment conductor 25 has a high occupying rate of the armature windings 22 but easily generates heat. Thus, the use of the segment conductors 25 in the structure having superior heat releasing properties due to the outer circumferential core projections 26 of the stator core 21 forms a further preferable structure.

(3) The frames 11 and 12 include the fastening portions 11c and 12c (coupling portion), which receive the holding load in the axial direction from the through bolts 15, and contact portions (bottom surfaces 72a of the accommodation recesses 72), which are formed at locations axially extending from the fastening portions 11c and 12c and contact the outer circumferential core projections 26 of the stator core 21 in the axial direction. The outer circumferential core projection 26 is sandwiched in the axial direction by the bottom surfaces 72a of the accommodation recesses 72 in each of the frames 11 and 12. In this structure, the bottom surfaces 72a of the accommodation recesses 72 contacts the outer circumferential core projections 26 along lines on which the holding load of the through bolts 15 act. Thus, force couple based on the holding load of the frames 11 and 12 is not generated and, consequently, deformation of the frames 11 and 12 is further limited.

(4) The outer circumferential core projections 26 each include the engagement groove 26a (engagement recess) that engages the through bolt 15 in the circumferential direction. Thus, the outer circumferential core projections 26 of the stator core 21 are engaged, in the circumferential direction, with the through bolts 15, which couple the frames 11 and 12. This restricts free rotation of the stator core 21.

(5) The frames 11 and 12 include the fitted portions 71 fitted to the axial ends of the stator core 21. Thus, the fitted portions 71 stably hold the stator core 21 (in particular, in the radial direction).

(6) The core sheets 30 of the stator core 21 are formed by performing punching with the same punching die. When stacking the core sheets 30 in the axial direction, the same punching locations are shifted from one another in the circumferential direction. That is, the stator core 21 has a structure in which the core sheets 30 are rotated and stacked to limit biases in the dimensional accuracy of each core sheet 30. This reduces the cogging torque related to the number of slots of the stator 13 and the number of poles of the rotor 14.

(7) The stator core 21 includes sixty teeth, and four outer circumferential core projections 26 are arranged at a 90-degree interval in the circumferential direction. This allows the core sheets 30 to be rotated and stacked in a preferable manner. When punching out and forming the core sheets 30 and the magnetic plates 40 from square steel plates, the projections 34 and the projections 45 are set at the corners of the four sides of the steel plate when performing punching. This allows the core sheets 30 and the magnetic plate 40 to be formed from smaller steel plates and improves yield.

(8) The stator core 21 includes the main core 31 and the magnetic plates 40, which are located at the axial ends of the main core 31. The magnetic plates 40 each include the stacked portion 41, which is stacked on the core sheet 30 (core sheet 30a) at the axial end of the main core 31, and the rotor opposing portions 44, which extend toward the axially outer side from the end of the stacked portion 41 closer to the rotor 14 and radially face the rotor 14. In this structure, the rotor opposing portions 44 of the magnetic plate 40 extend toward the axially outer side (side opposite to the main core). This allows the axial length of the main core 31 to be limited and further contributes to the miniaturization of the motor 10 in the axial direction without reducing the area opposed to the rotor 14 in the stator core 21.

The first and second projections 52 and 53 of the segment conductors 25 are formed to radially face the rotor opposing portions 44 of the magnetic plate 40. This limits enlargement of the stator 13 in the axial direction while obtaining the area opposed to the rotor 14 in the stator core 21 with the rotor opposing portions 44 of the magnetic plate 40 and achieving high output.

(9) The stacked portion 41 of the magnetic plate 40 is caulked and fixed to the core sheet 30 at the axial end of the main core 31, so that the magnetic plate 40 is easily fixed with respect to the core sheet 30.

(10) The swaged portions (protrusions 42a and through holes 30d) of the magnetic plates 40 and the core sheets 30 are formed at the radially inner side of the outer circumferential core projections 26 and at the same circumferential positions as the outer circumferential core projections 26 in the cylindrical portion 23. In this structure, the protrusions 42a and the through holes 30d are formed in the cylindrical portion 23 at locations where the radial width is increased due to the formation of the outer circumferential core projection 26. This limits the influence of the protrusions 42a and the through holes 30d on the magnetic flow in the cylindrical portion 23.

(11) The swaged portions (protrusions 42a and through holes 30d) of the magnetic plates 40 and the core sheets 30, and the swaged portions (protrusions 32a and recesses 32b (through holes 30c)) of the core sheets 30 both implement dowel swaging and are set to have different dowel diameters. In this structure, the dowel diameter is set in accordance with the thickness of the core sheets 30 and the thickness of the magnetic plates 40, the locations where the swaged portions are formed, and the like. When the plate thickness T1 of the magnetic plate 40 is greater than the plate thickness T2 of the core sheet 30 like in the present embodiment, the dowel diameter of the swaged portions (protrusions 42a and through holes 30d) of the magnetic plates 40 and the core sheets 30 is increased. This limits increase in the magnetic resistance at the swaged portions while obtaining swaging strength.

(12) When the swaged portions (protrusions 32a and recesses 32b (through holes 30c)) of the core sheets 30 are formed at the radially inner side of the locations held between the frames 11 and 12 in the cylindrical portion 23, the swaged portions between the core sheets 30 are formed at positions separated from the locations held between the frames 11 and 12. This limits increases in the magnetic resistance that occurs when the swaged portions receive the holding load.

(13) The plate thickness T1 of the magnetic plate 40 is set to be greater than the plate thickness T2 of the core sheet 30 so that magnetic force is easily drawn through the magnetic plates 40. This further increases the output. Since the plate thickness T1 of the magnetic plate 40 is greater than the plate thickness T2 of the core sheet 30, the large chamfered portions 43a (e.g., chamfered portion having an arcuate cross-section and a curvature radius Rm that is greater than the plate thickness T2 of the core sheet 30) is easily formed at each corner of the tooth formation portion 43 of the magnetic plate 40. This limits damages to the bent portions of the segment conductors 25.

The embodiment described above may be modified as follows.

In the embodiment described above, the frames 11 and 12 hold, in between, the outer circumferential core projections 26 in the stator core 21 and sections of the cylindrical portion 23 located closer to the radially outer side (circumferential region of the cylindrical portion 23). Instead, for example, the frames 11 and 12 may hold, in between, only the outer circumferential core projections 26. This structure has the following advantages.

(14) Since the frames 11 and 12 hold, in between, only the outer circumferential core projections 26 in the stator core 21, the formation of the force couple in the frames 11 and 12 is limited in a further preferable manner.

(15) The stator core 21 includes the core sheets 30 stacked in the axial direction. Each core sheet 30 is relatively thin and is thus easily deformed and magnetically altered by the holding load from the frames 11 and 12. In this regards, the influence of the holding load on the magnetic flow in the stator core 21 is more effectively limited since the outer circumferential core projections 26, in which the magnetic flow is small compared to the cylindrical portions 23, are held between the frames 11 and 12.

In the embodiment described above, the core sheets 30 and the magnetic plates 40 respectively include the projections 34 and 45 forming the outer circumferential core projections 26. The bottom surfaces 72a of the accommodation recesses 72 contact (hold in between) the projections 45 of the magnetic plates 40 in the axial direction. Instead, the structure shown in FIGS. 10 and 11, for example, may be employed.

Figure 10:
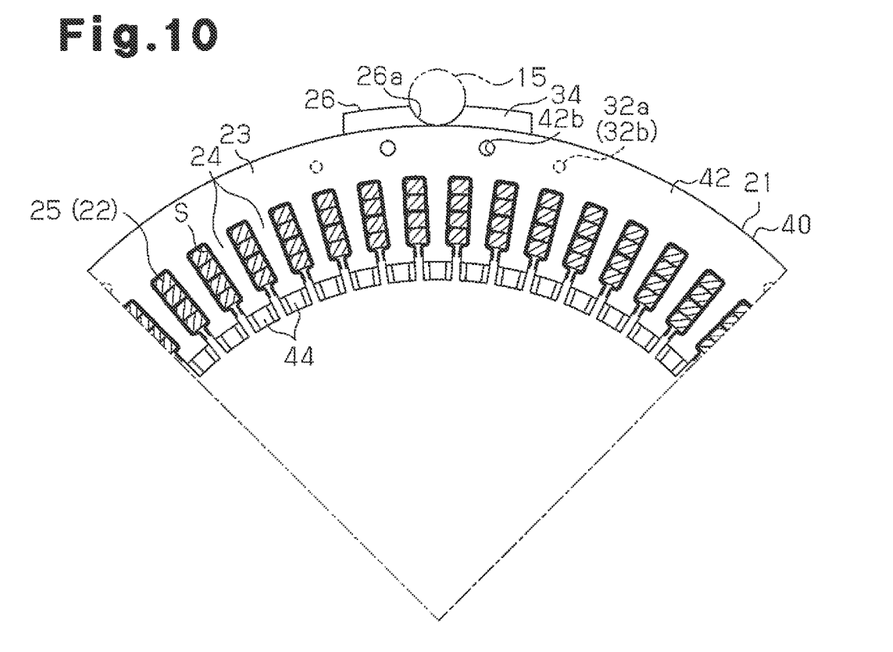
FIG. 10 is an enlarged plan view showing a motor of a further example in part.

In the structure shown in FIGS. 10 and 11, the projections 45 are omitted from the magnetic plates 40 of the embodiment described above so that the annular portion 42 has a circular rim, and the outer circumferential core projections 26 are formed by only the projections 34 of the core sheets 30. The bottom surfaces 72a of the accommodation recesses 72 contact (hold in between) the projections 34 of the core sheet 30 in the axial direction (see FIG. 11).

This structure further decreases the holding load applied between the magnetic plates 40 and the core sheets 30a to the swaged portions (protrusions 42a and through holes 30d) or the welded portions. Further, since the frames 11 and 12 are formed so as not to contact the magnetic plates 40 in the axial direction, variations (tolerance) may be limited in the axial distance between the frames 11 and 12 holding the main core 31. This limits variations in the axial dimensions of the entire motor 10. When increasing the output by increasing the plate thickness T1 of the magnetic plates 40 to be greater than the plate thickness T2 of the core sheets 30 like in the embodiment described above, variations increases in the plate thickness of the magnetic plate 40. Accordingly, since the frames 11 and 12 are formed not to contact the magnetic plates 40 in the axial direction, the effect for limiting variations in the axial dimensions of the entire motor 10 becomes further outstanding.

Figure 12:
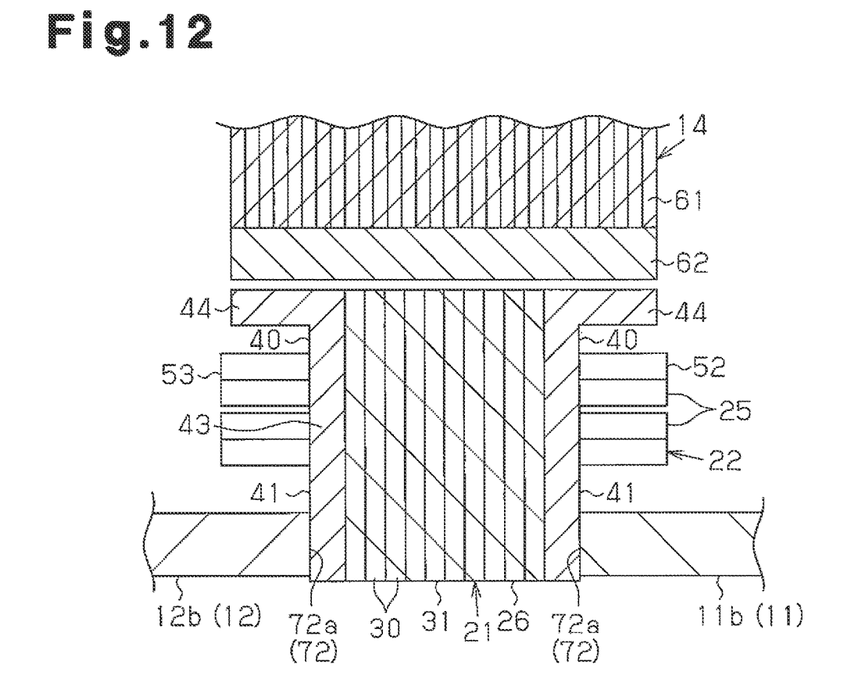
FIG. 12 is an enlarged schematic cross-sectional view showing a motor of another example.

In the embodiment described above, the segment conductors 25 are each bent at the first projection 52 connecting the two straight portions 51 inserted through each slot S. Further, the segment conductors 25 are joined by welding the second projections 53. Instead, for example, as shown in FIG. 12, the two straight portions 51 may be formed as discrete bodies that are welded together in the first projection 52 to form the segment conductor 25. Instead of welding, the segment conductors 25 may be connected by structure using a discrete member such as a bus bar or the like.

In the embodiment described above, twelve protrusions 32a (recesses 32b) are formed at equal intervals (30-degree intervals) in the circumferential direction of the annular portion 32. However, the number and locations of the protrusions 32a (recesses 32b) may be changed.

In the embodiment described above, two protrusions 42a are provided for each projection 45 (eight protrusions 42a in total). Instead, one protrusion 42a may be provided for each projection 45 (four protrusions 42a in total).

The setting of the dowel diameter and the like of the swaged portion (protrusions 32a and 42a, recesses 32b and 42b, and through hole 30c and 30d) in the embodiment described above may be changed in accordance with the structure.

In the embodiment described above, the fitted portion 71 is arranged in each of the frames 11 and 12. Instead, the fitted portion 71 may be omitted from each of the frames 11 and 12 in the embodiment described above. Further, the stator holding portions 11b and 12b of the frames 11 and 12 may include fitted portions positioned and fitted (externally fitted) onto the outer circumferential core projections 26.

In the embodiment described above, the frames 11 and 12 are made from a metal material such as aluminum, steel, and the like. Instead, each of the frames 11 and 12 may be made from a resin material as long as it has the same strength as the metal material.

In the embodiment described above, the two through bolts 15 couple the frames 11 and 12. However, three or more through bolts 15 may couple the frames 11 and 12.

In the embodiment described above, the outer circumferential core projections 26 include the engagement grooves 26a that engages the through bolt 15 in the circumferential direction. Instead, the engagement grooves 26a may be omitted from the outer circumferential core projections 26 so that the outer circumferential core projections 26 do not engage the through bolts 15.

The number of teeth 24 of the stator core 21 does not have to be sixty and may be changed.

In the embodiment described above, four outer circumferential core projections 26 are arranged at an interval of 90 degrees in the circumferential direction. Instead, for example, two outer circumferential core projections 26 may be arranged at an interval of 180 degrees. Alternatively, three outer circumferential core projections 26 may be arranged at an interval of 120 degrees. In these cases, the core sheets 30 punched out from steel plates by the same punching die are shifted, when stacked, by 180 degrees (or 120 degrees) in the circumferential direction to form the main core 31. When three outer circumferential core projections 26 are arranged at 120-degree intervals, each core sheet 30 is rotated by 120 degrees when stacked to cancel three waves of the cogging torque wave including the cogging torque component unique to the core sheets 30. As a result, the cogging torque may be reduced.

In the embodiment described above, the rotor opposing portion 44 is trapezoidal when viewed from the radial direction. Instead, the rotor opposing portion 44 only needs to be shaped so that magnetic force may be drawn and may be, for example, tetragonal as viewed in the radial direction.

In the embodiment described above, the stacked portion 41 of the magnetic plate 40 includes the annular portion 42 and the tooth formation portions 43. Instead, the stacked portion 41 may be formed by only the tooth formation portions 43.

In the embodiment described above, is swaged and fixed to the main core 31 (core sheets 30). Instead, the magnetic plate 40 may be, for example, adhered or welded to the main core 31 (core sheets 30).

In the embodiment described above, the plate thickness T1 of the magnetic plate 40 is set to be greater than the plate thickness T2 of the core sheet 30. Instead, the plate thickness T1 of the magnetic plate 40 may be set to be less than or equal to the plate thickness T2 of the core sheet 30.

In the embodiment described above, the magnetic plate 40 is arranged on two axial sides of the main core 31. Instead, the magnetic plate 40 may be arranged only on one axial side of the main core 31. Further, in the embodiment described above, the stator core 21 is formed by the main core 31 including the core sheets 30 and the two magnetic plates 40. Instead, the stator core 21 may be formed by only the main core 31 (core sheets 30).

In the embodiment described above, the main core 31 of the stator core 21 has a stacking structure of the core sheets 30. Instead, the main core 31 may be, for example, an integral molded product that is casted.

In the embodiment described above, the armature windings 22 are formed by the segment conductors 25. Instead, for example, armature windings may be obtained by winding copper wires around the teeth.

In the embodiment described above, the ferrite magnet is used as the field magnet 62 of the rotor 14. Instead, for example, neodymium magnet or the like may be used.

In the embodiment described above, the rotor core 61 and the field magnets 62 of the rotor 14 may have axial lengths that differ from the axial length of the inner circumferential end of the stator core 21 (i.e., length from the distal end of the rotor opposing portion 44 of one magnetic plate 40 to the distal end of the rotor opposing portion 44 of the other magnetic plate 40).

The invention claimed is:

1. A motor comprising:
   a stator including a stator core, a plurality of teeth extending toward a radially inner side from a main circumferential portion of the stator core, and an armature winding attached to the teeth, wherein the stator core includes a held portion that projects toward a radially outer side from the main circumferential portion;

a first frame and a second frame respectively arranged on two axial sides of the stator core to hold, in between, at least the held portion of the stator core in the axial direction, wherein the first frame and the second frame are formed so that the main circumferential portion of the stator core is exposed to the exterior from between the first frame and the second frame;

a coupling member that couples the first and second frames at the radially outer side of the stator while applying a holding load to the first and second frames in the axial direction; and a rotor rotatably supported by the first and second frames and arranged at the radially inner side of the stator, wherein the stator core includes a main core and a magnetic plate arranged at an axial end of the main core; and the magnetic plate includes a stacked portion, which is stacked on the axial end of the main core, and a rotor opposing portion, which extends toward the axially outer side from an end of the stacked portion closer to the rotor and which radially faces the rotor, and the armature winding projects in the axial direction from the axial distal end of the rotor opposing portion, the armature winding includes a plurality of segment conductors, wherein the plurality of segment conductors are welded and joined with each other, and the welding portion of the segment conductors is formed at an axially outer side from the axial distal end of the rotor opposing portion, the main core includes a plurality of core sheets stacked in the axial direction, and adjacent ones of the core sheets in the axial direction are swaged and fixed to each other, the plurality of core sheets including a first core sheet adjacent the magnetic plate and including additional core sheets, the stacked portion of the magnetic plate is stacked on the first core sheet at the axial end of the main core, and swaged and fixed to the first core sheet at the axial end of the main core, and the magnetic plate and the first core sheet are swaged to form a first swaged portion, the additional core sheets are swaged to form a second swaged portion, the first swaged portion is formed at a location different from the second swaged portion in a circumferential direction, and not overlapped with the second swaged portion in the axial direction.

2. The motor according to claim 1, wherein each segment conductor is inserted into a slot formed between adjacent ones of the teeth in the circumferential direction and includes a projection that projects out of the slot in the axial direction, and the projections of the segment conductors are electrically connected to each other.

3. The motor according to claim 2, wherein the projection includes a first projection that projects out of the slot in one axial direction and a second projection that projects out of the slot in the other axial direction, the first projection includes a bent portion of the segment conductor and is formed to tilt toward the radially outer side, and the second projection includes the welding portion.

4. The motor according to claim 1, wherein each of the first and second frames includes a coupling portion, which receives the holding load applied in the axial direction from the coupling member, and a contact portion, which extends from the coupling portion in the axial direction and contacts the held portion of the stator core in the axial direction; and the held portion is axially held between the contact portions of the first and second frames.

5. The motor according to claim 1, wherein the first and second frames hold, in between, the held portion and a section of the main circumferential portion located at the radially outer side.

6. The motor according to claim 1, wherein the first and second frames hold, in between, only the held portion of the stator core.

7. The motor according to claim 1, wherein the held portion includes an engagement recess that engages the coupling member in a circumferential direction.

8. The motor according to claim 1, wherein each of the first and second frames includes a fitted portion fitted to an axial end of the stator core.

9. The motor according to claim 1, wherein the additional core sheets are punched and formed by the same punching die, and the additional core sheets are stacked in the axial direction so that the same punching locations are shifted from each other in the circumferential direction.

10. The motor according to claim 9, wherein
the teeth are sixty in number, and
the held portion is one of a plurality of held portions arranged at 90-degree or 180-degree intervals in the circumferential direction.

11. The motor according to claim 9, wherein
the teeth are sixty in number, and
the held portion is one of three arranged at 120-degree intervals in the circumferential direction.

12. The motor according to claim 1, wherein the first swaged portion is formed at the radially inner side of the held portion at the same circumferential position as the held portion in the main circumferential portion.

13. The motor according to claim 1, wherein the magnetic plate and the core sheet are dowel-swaged to form the first swaged portion, the core sheets are dowel-swaged to form the second swaged portion, the first and the second swaged portions are set to have different dowel diameters, and each of the first and the second swaged portions include protrusions fitting into recesses, each one of the protrusions contacting bottom and side surfaces of one of the recesses.

14. The motor according to claim 13, wherein a plate thickness of the magnetic plate is greater than that of the core sheet, and the dowel diameter of the first swaged portion is greater than that of the second swaged portion.

15. The motor according to claim 1, wherein the second swaged portion is formed on the main circumferential portion at the radially inner side of a location held between the first and second frames.

* * * * *